US 8,473,951 B2

(12) United States Patent
Sharon et al.

(10) Patent No.: US 8,473,951 B2
(45) Date of Patent: Jun. 25, 2013

(54) METHOD AND SYSTEM FOR TRAVERSING IN REVERSE CHRONOLOGICAL ORDER ALONG A CRITICAL PATH OF A PLURALITY OF JOBS, AND REDUCING TIME GAPS BETWEEN JOBS UNTIL AN ESTIMATED END TIME OF THE LAST JOB IS LESS THAN OR EQUAL TO A TARGET END TIME

(75) Inventors: Eyal Sharon, Modiin (IL); Yoel Tourgeman, Tel Aviv (IL); Yakov Tchenak, Rishon Le Zion (IL); Tamar Admon, Tel Aviv (IL); Hana Amram, Tiberias (IL); Ohad Chenkin, Ra'anana (IL)

(73) Assignee: BMC Software, Inc., Houston, TX (US)

( * ) Notice: Subject to any disclaimer, the term of this patent is extended or adjusted under 35 U.S.C. 154(b) by 627 days.

(21) Appl. No.: 12/649,925

(22) Filed: Dec. 30, 2009

(65) Prior Publication Data

US 2011/0161959 A1 Jun. 30, 2011

(51) Int. Cl.
*G06F 9/46* (2006.01)
(52) U.S. Cl.
USPC .......................................................... 718/101
(58) Field of Classification Search
USPC ................................................. 718/101, 102
See application file for complete search history.

(56) References Cited

U.S. PATENT DOCUMENTS

| 7,406,689 B2* | 7/2008 | Berstis et al. ................. 718/102 |
| 8,000,946 B2* | 8/2011 | Haas et al. ......................... 703/6 |
| 2003/0149717 A1* | 8/2003 | Heinzman ..................... 709/101 |
| 2009/0158287 A1* | 6/2009 | Cardelli ......................... 718/102 |
| 2009/0282411 A1* | 11/2009 | Carteri et al. ................. 718/102 |

* cited by examiner

*Primary Examiner* — Thomas Lee
*Assistant Examiner* — Xuxing Chen

(57) ABSTRACT

Systems and methods for improved batch flow management are described. At least some embodiments include a computer system for managing a job flow including a memory storing a plurality of batch queue jobs grouped into Services each including a job and a predecessor job. A time difference is the difference between a scheduled job start time and an estimated predecessor job end time. Jobs with a preceding time gap include jobs immediately preceded only by non-zero time differences. The job start depends upon the predecessor job completion. The computer system further includes a processing unit that identifies jobs preceded by a time gap, selects one of the Services, and traverses in reverse chronological order a critical path of dependent jobs within the Service until a latest job with a preceding time gap is identified or at least those jobs along the critical path preceded by another job are traversed.

19 Claims, 13 Drawing Sheets

METHOD AND SYSTEM FOR TRAVERSING IN REVERSE CHRONOLOGICAL ORDER ALONG A CRITICAL PATH OF A PLURALITY OF JOBS, AND REDUCING TIME GAPS BETWEEN JOBS UNTIL AN ESTIMATED END TIME OF THE LAST JOB IS LESS THAN OR EQUAL TO A TARGET END TIME

BACKGROUND

This disclosure relates generally to systems and methods used to manage the flow of batch jobs on a computer system. While most people use computer systems to perform tasks interactively through graphical user interfaces, a significant number of tasks are performed by computer systems as batch jobs. Batch jobs are generally used in applications where large amounts of data are needed to complete a task in which data can be accessed and processed without human interaction. Examples of tasks that lend themselves to batch job processing include payroll processing, data collection from large numbers of remote sources and data backups. In large computer systems, software may sometimes be utilized that enables an operator to schedule such jobs so as to meet specific execution start and end time requirements of the batch jobs.

As computer systems have continued to provide increasingly larger processing capacities, however, the numbers of batch jobs that may be scheduled for execution have also continued to increase. As a result, a large mainframe computer may have hundreds or even thousands of batch jobs scheduled for execution at any given point in time. To further complicate matters, groups of jobs may have interdependencies such that one job within a group cannot start until other jobs have completed, and there may be additional time constraints that require that the group start execution at a specific time and complete execution no later than a prescribed end time.

With so many jobs and interactions to contend with, manually scheduling batch jobs such that all the operational constraints are met can be daunting, despite the use of the above-described scheduling software. To make matters worse, if there is any delay in the execution of the scheduled jobs, or if more jobs must be added, it may be necessary for an operator to quickly restructure the schedule in order to not push out the completion of any job or group of jobs beyond its required completion time. This may not be practical or even achievable by the operator, given the sheer volume of information that the operator must take in to account in order to make such changes. It would be desirable to provide a tool that identifies for an operator a subset of jobs within a critical path of one or more job flows that will provide the greatest improvement in job completion times and that does so quickly enough for the adjustment to timely correct job scheduling violations.

SUMMARY

Systems and methods for improved batch flow management are described herein. At least some example embodiments include a computer system for managing a flow of batch jobs that includes a memory that stores a plurality of jobs within a batch queue grouped together into one or more Services that each includes a job and a predecessor job. A time difference is defined as the difference between the scheduled start time of the job and an estimated end time of the predecessor job. Jobs with a preceding time gap include jobs immediately preceded only by non-zero time differences. The job start depends upon the predecessor job completion. The computer system further includes a processing unit (coupled to the memory) that identifies those jobs from the plurality of jobs preceded by a time gap, selects a Service from the one or more Services, and traverses in reverse chronological order a critical path of dependent jobs within the selected Service until a latest job with a preceding time gap is identified or until at least those jobs along the critical path preceded by another job are traversed.

Other embodiments include a method performed by a computer system for managing the flow of batch jobs within a computer system that includes grouping a plurality of jobs within the batch queue into one or more Services that each includes a job and a predecessor job and determining a time difference defined as the difference between a scheduled start time of the job and an estimated end time of the predecessor job. The job start depends upon the predecessor job completion. The method further includes identifying those jobs from the plurality of jobs preceded by a time gap (which includes jobs immediately preceded only by non-zero time differences), selecting a Service from the one or more Services and traversing in reverse chronological order a critical path of dependent jobs within the selected Service until a latest job with a preceding time gap is identified or until at least those jobs along the critical path preceded by another job are traversed. Still other embodiments include a computer-readable storage medium having software stored thereon that can be executed on a processor to cause the processor to perform the method in accordance with the above description.

Yet other embodiments include a networked computer system that includes a communication network and a plurality of computer systems each coupled to the communication network. At least one computer system from the plurality of computer systems includes a memory that stores a plurality of jobs within a batch queue, grouped together into one or more Services that each includes a job and a predecessor job. A time difference is defined as the difference between the scheduled start time of the job and an estimated end time of the predecessor job. Jobs with a preceding time gap include jobs immediately preceded only by non-zero time differences. The job start depends upon the predecessor job completion. The at least one computer system further includes a processing unit (coupled to the memory) that identifies those jobs from the plurality of jobs preceded by a time gap, selects a Service from the one or more Services, and traverses in reverse chronological order a critical path of dependent jobs within the selected Service until a latest job with a preceding time gap is identified or until at least those jobs along the critical path preceded by another job are traversed.

DETAILED DESCRIPTION

The present disclosure describes systems and methods for managing and improving the execution times of a flow of batch jobs within a computer system. In at least some embodiments, such improvements are achieved by software executing on the computer system that analyzes groups of related batch jobs scheduled for execution (each group hereinafter referred to as a "Service"), identifies jobs that if rescheduled would have the most significant impact on the completion time of a Service (i.e., jobs within the Service's critical path), and allows an operator to select and reschedule jobs within each Service.

Figure 1:
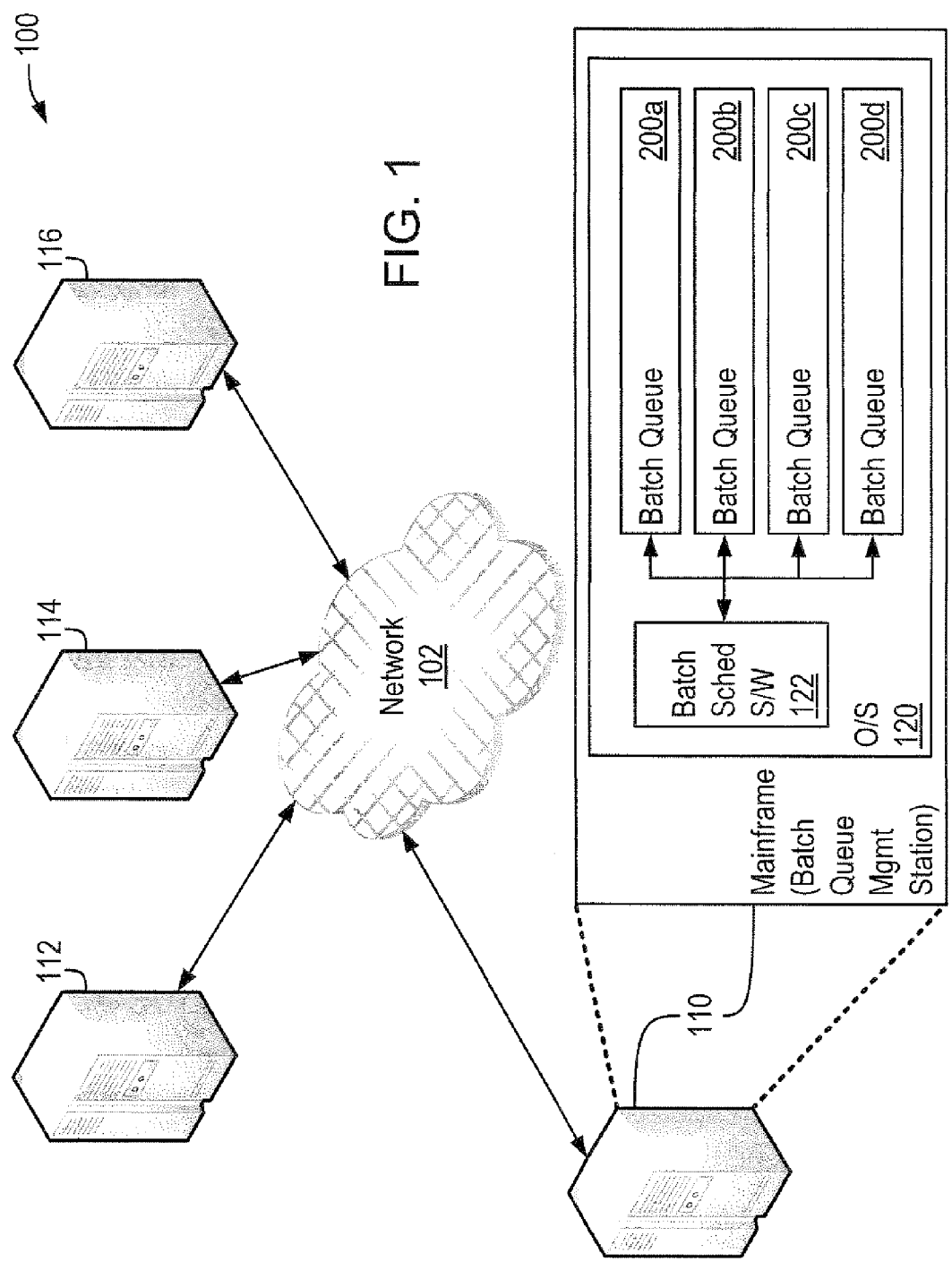
FIG. 1 illustrates an example system that incorporates an improved batch job flow implemented in accordance with at least some embodiments.

FIG. 1 shows an example system 100 that includes mainframe computer systems 110, 112, 114 and 116 interconnected by network 102. Each mainframe system may be a source of batch jobs that are submitted to one or more batch queues within system 100. In the example shown, mainframe 110 (e.g., an IBM System z10®) runs operating system (O/S) 120 (e.g., z/OS®) within which multiple batch queues 200a-200d are maintained. (System z10 and z/OS are registered trademarks of the International Business Machines Corporation.) In illustrative system 100, mainframe 110 also operates as a batch queue management station, and batch scheduling software (Batch Sched S/W) 122 performs scheduling and queue management tasks, determining which jobs are placed on which queues based upon factors such as, e.g., system resource availability, priority and execution start and end time requirements.

Batch jobs may be submitted to the batch queue from within mainframe 110 and/or from any of mainframes 112, 114 and 116 across network 102. Similarly, batch jobs executing on mainframe 110 may access data and other resources provided across network 102 by any of the other mainframes. While the example of FIG. 1 shows the batch queues executing directly on a single mainframe, jobs from each queue may be distributed among one or more processors within the mainframe, among one or more partitions defined within the mainframe, and/or among one or more virtual machine images installed within the mainframe (e.g., using z/VM®). (z/VM is a registered trademark of the International Business Machines Corporation.) Job queues managed by batch scheduling software 122 may also be maintained on any of the other mainframes 112, 144 and 116 as well as on any partition or virtual machine within each of these mainframes.

Figure 2:
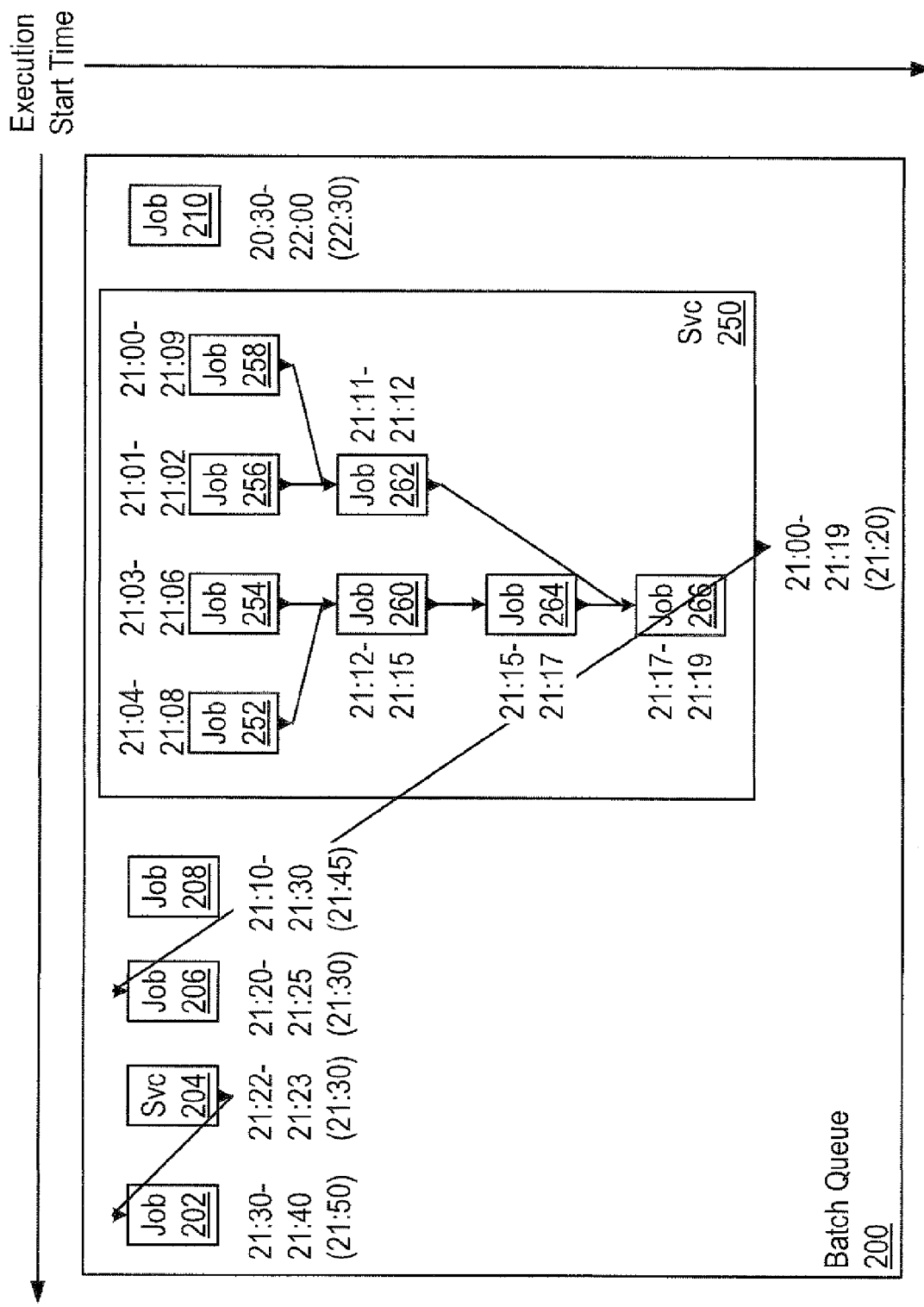
FIG. 2 illustrates an example Service within a batch queue on the system of FIG. 1 that includes multiple jobs, job flows and job interdependencies.

Each of queues 200a-200d of FIG. 1 maintains a list of scheduled jobs and Services. FIG. 2 shows a more detailed view of such jobs (e.g., jobs 202, 206-210 and 252-266) and Services (e.g., Services 204 and 250) within an example batch queue 200. Each job and Service has an associated scheduled start time (the first time shown), an estimated end time (the second time shown) and a "must complete by" time (shown in parenthesis). If the start of one job or Service depends upon the completion of another job or Service, this is shown by an interdependency line with arrow heads indicating the direction of the interdependency. Thus, for example, job 202 cannot start until Service 204 completes. Further, one or more jobs may depend upon one or more other jobs and/or Services, and one or more Services may depend upon one or more other Services and/or jobs.

The jobs illustrated in FIG. 2 are shown in scheduled execution start order from right to left and from top to bottom. Thus job 210 is the next job scheduled to execute at 20:30, is estimated to complete execution by 22:00, but must complete execution no later than 22:30. Jobs 258, 256, 254, 252 and 262, for example, would subsequently start executing in sequence, based upon the scheduled execution times shown. Throughout this disclosure, a job closest in time (relative to the current time) to execution is referred to as the "soonest" job (e.g., job 210), while a job furthest in time from executing is referred to as the "latest" job (e.g., job 202). Also, as can be seen from the scheduled start times of the various jobs and Services shown, multiple jobs may be scheduled for overlapping execution. This may be accomplished by time slice utilization of processing resources, by the use of a pool of dynamically allocated resources, or by any other concurrent processing technique known in the art.

In order to determine the estimated completion times of the various jobs and Services within the example queue of FIG. 2, simulation software is utilized to predict such times based upon scheduling constraints and the specific hardware and software resources of the mainframe made available for queue operations. The simulation software may be integrated within batch scheduling software 122 of FIG. 1, or may be implemented as a separate software module (not shown). Many such simulation software programs known in the art may be suitable for estimating the aforementioned completion times, and all such software programs are contemplated by the present disclosure.

Continuing to refer to the example of FIG. 2, Service 250 includes jobs 252-266, is scheduled to start executing at 21:00, is estimated to complete execution by 21:19, and has a must complete by time of 21:20. While each of jobs 252-258 may be required to start specifically at their scheduled start times, each of jobs 260-266 may be rescheduled for execution start times earlier or later than those shown, as long as the interdependencies of a re-scheduled job are maintained and as long as the must complete by time of Service 250 is not exceeded. Thus, for example, job 260 may be rescheduled to execute starting as early as 21:08, but no earlier as job 252 (upon which job 260 depends) is estimated to end execution no earlier than 21:08.

Figure 3:
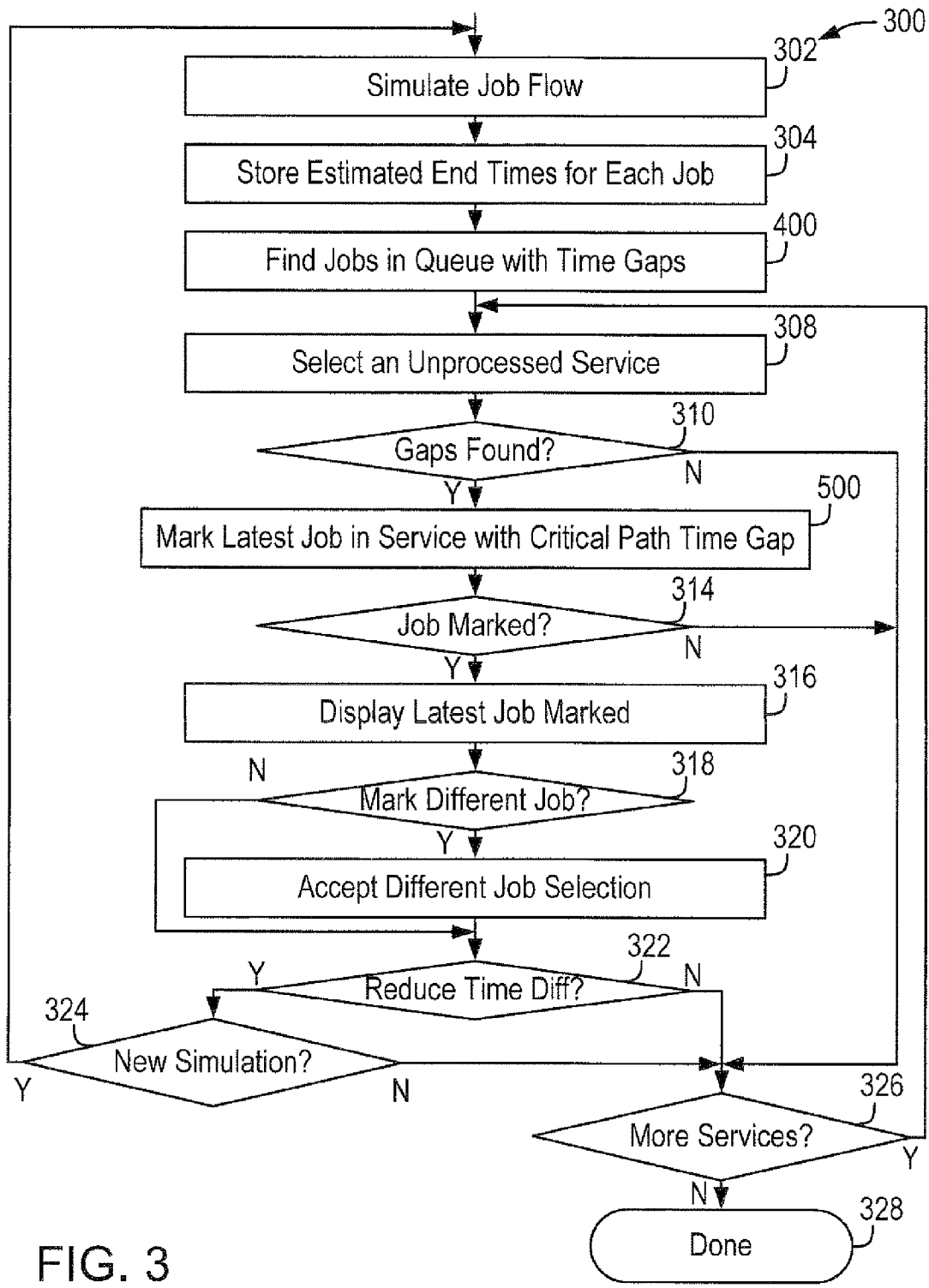
FIG. 3 illustrates an example method 300 for identifying the latest critical path job preceded by a time gap within each of one or more Services in a batch queue.

The estimated end times of the jobs and Services within a batch queue depend upon the content of the queue. Thus if jobs and/or Services are added to a batch queue, the estimated end times may change, which could cause a violation of the must complete by time specified for one or more jobs and/or Services. One way to correct such violations is to reschedule jobs within a Service to pull back the estimated end time for the Service. FIG. 3 shows an example method 300 that may be implemented by batch scheduling software 122 of FIG. 1 and that automates the process of identifying which jobs within a Service's critical path, if rescheduled, will improve the execution end time of the Service. Method 300 further automates the process of identifying the job that will execute latest, thus identifying the job that will likely most effectively improve the execution end time. The method may be applied iteratively to a Service so as to effect the greatest possible shift in the overall execution end time of the Service.

Method 300 begins by performing a simulation to estimate the execution end times of each job and Service within a queue (block 302). Each of these estimated end times are stored for each job (block 304) and the queue is searched to find jobs within the Service preceded by time gaps (block 400, shown in FIG. 4 as method 400 and described below). In at least some illustrative embodiments, jobs having a preceding time gap include jobs immediately preceded only by non-zero time differences. In other embodiments, jobs having a preceding time gap may further include jobs preceded by time differences with a value of zero. An unprocessed Service within the queue is selected (block 308) and if at least one job preceded by a time gap is found (block 310), the latest job preceded by a time gap within the critical path of the Service is marked (block 500, shown in FIG. 5 as method 500 and described below).

Figure 7A:
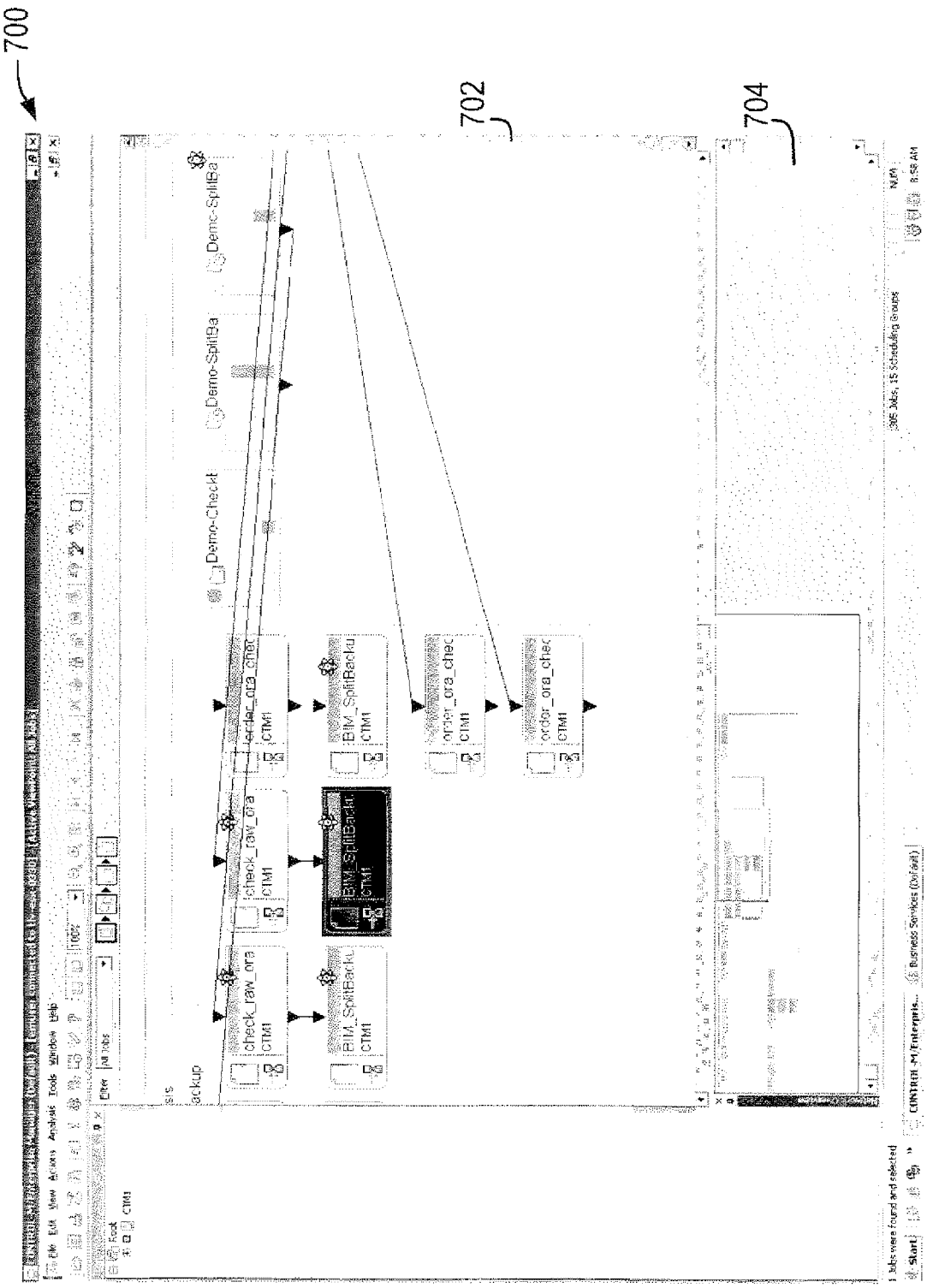
FIGS. 7A-7C illustrate examples of a user interface used to display jobs and Services within a batch queue, and to indicate to an operator a suggested job for rescheduling as determined by the methods of FIGS. 3, 4 and 5.
Figure 7B:
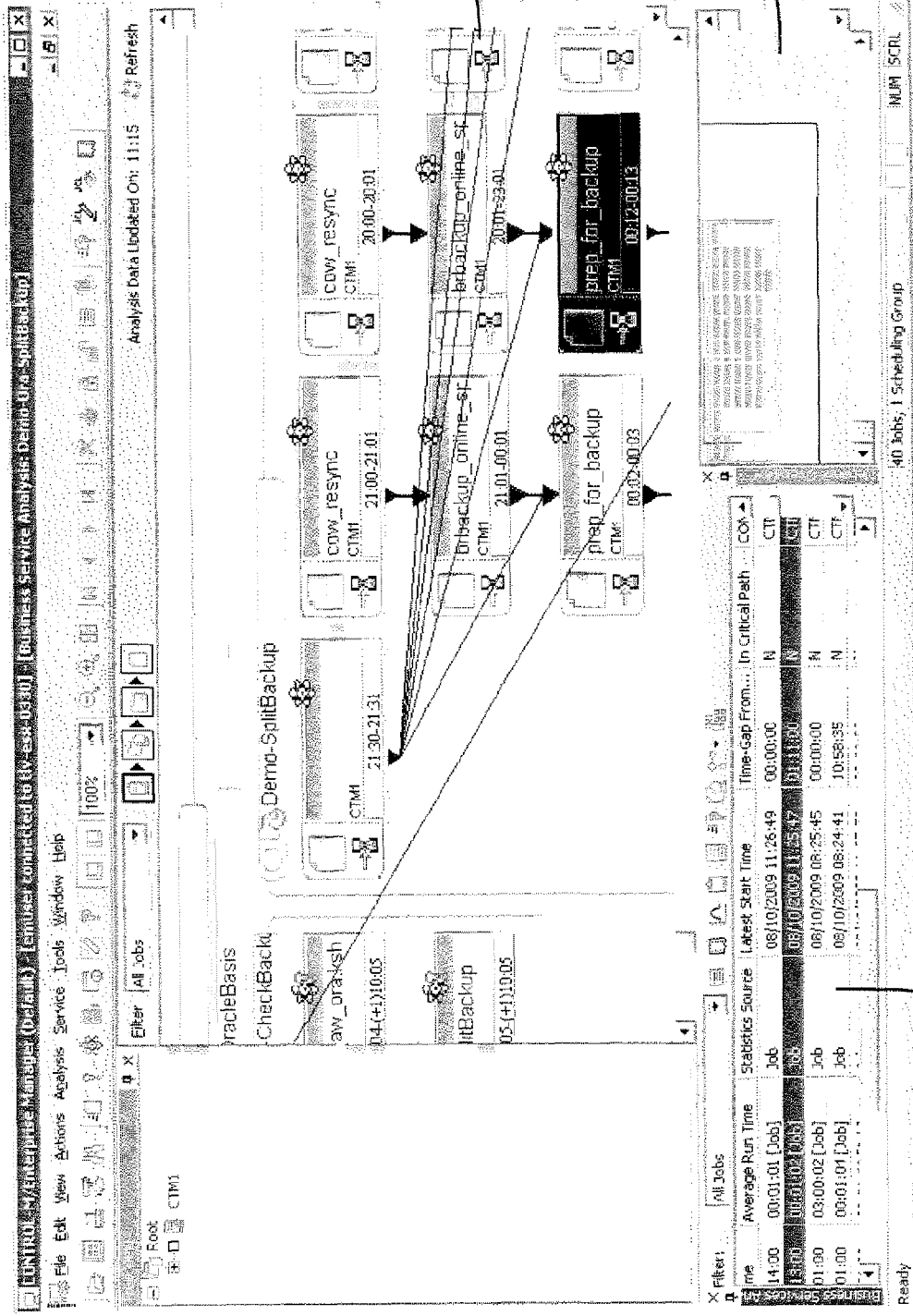
Figure 7C:
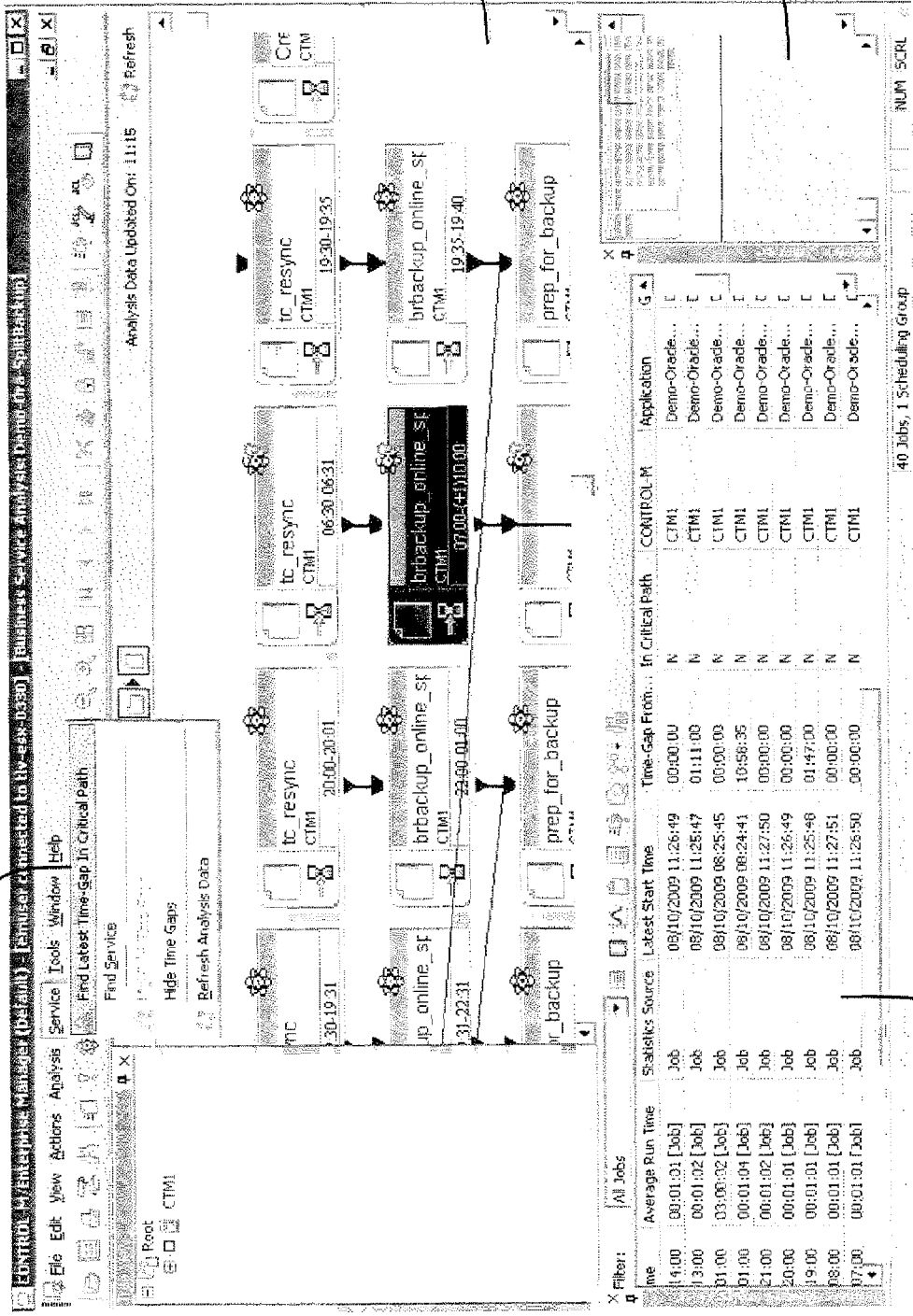

If a job within the Service is marked as the latest job (block 314), the marked job is displayed to the user (block 316), as shown in FIGS. 7B and 7C and described in more detail below. If the user decides to select a different job with a preceding time gap (block 318), the selection is accepted for subsequent use by the method (block 320). After such selection, or if the user does not select a different job (block 318) and instead opts to use the latest job marked by the method, the user selects whether or not to reduce a time difference preceding the latest or marked job. If the user opts to reduce a time difference (block 322) and to run a new simulation based upon the reduced time gap (block 324), steps 302-304, 400, 308-310, 500 and 314-324 are repeated to determine the revised end times and to again identify jobs that have preceding time gaps. At least some of the time differences may have changed as a result of the time gap reduction of the selected or marked job, and other jobs preceded by time gaps may now exist that previously were not so preceded.

If no job with a time gap is identified (block 310), no job is marked within the critical path of the Service (block 314), the time difference reduction is not selected (block 322) or the simulation is not re-executed (block 324), a check is performed to determine if there are more unprocessed Services within the queue. If so (block 326), blocks 308-310, 500 and 314-324 are repeated for another Service within the queue. If no unprocessed Services remain within the queue (block 326), the method ends (block 328).

Figure 4:
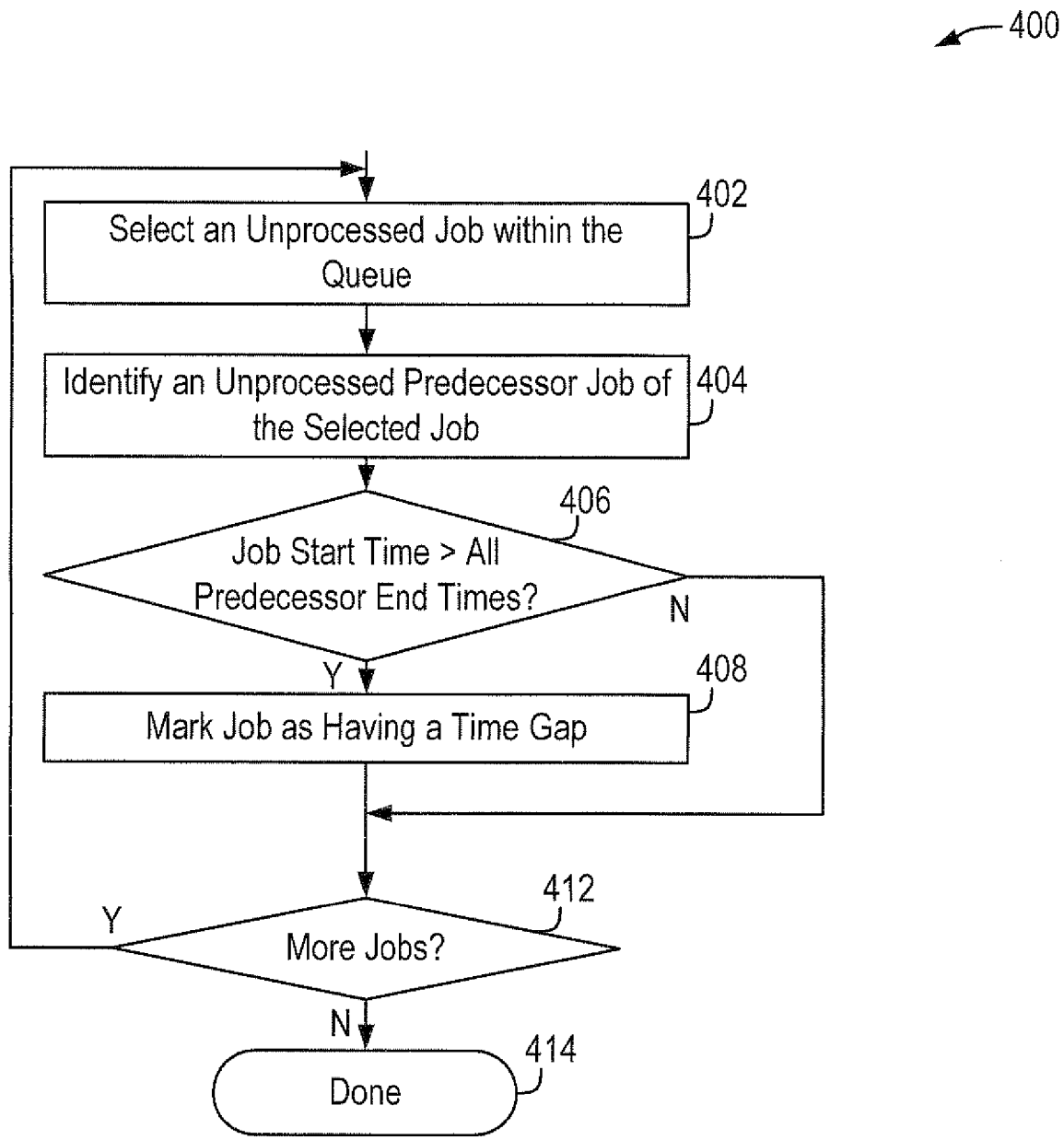
FIG. 4 illustrates an example method 400 for identifying all jobs within a Service preceded by time gaps.

FIG. 4 shows an example method 400 that implements block 400 of FIG. 3 to find all jobs with preceding time gaps within a queue, in accordance with at least some embodiments. An unprocessed job within the queue is selected (block 402), and if the start time of the selected job is greater than the estimated end time of all identified predecessor jobs (block 406) the selected job is marked as a job having a preceding time gap (block 408). If the start time of the selected job is not greater than the estimated end time of all identified predecessor jobs (block 406) or a job is marked (block 408), a check is performed to determine if there are additional unprocessed jobs remaining within the queue (block 412). If so, blocks 402-412 are repeated until no unprocessed jobs remain, thus marking all jobs in the queue with time gaps and ending the method (block 414). If no additional unprocessed jobs remain (block 412), the method ends (block 414).

Figure 5:
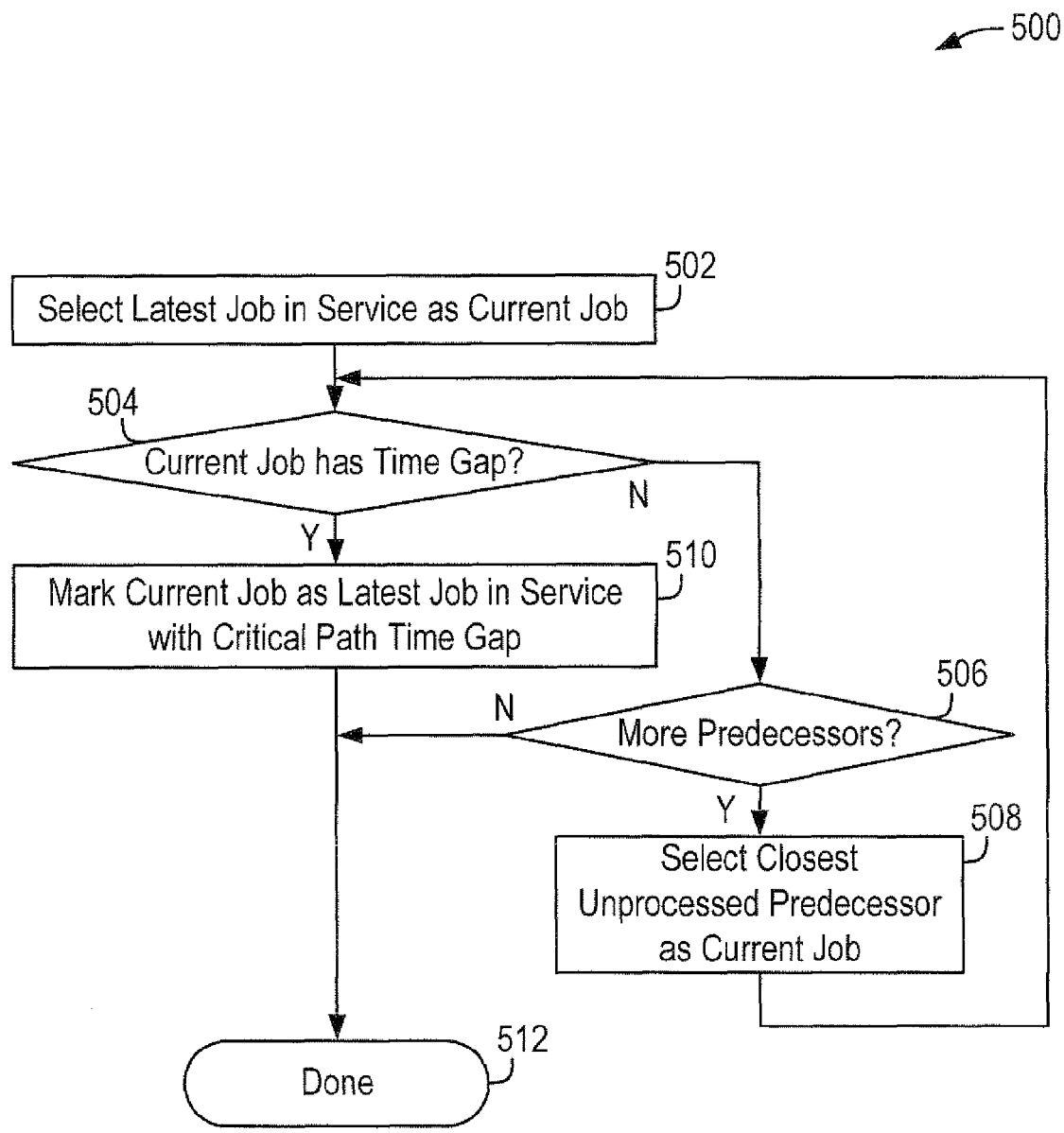
FIG. 5 illustrates an example method 500 for identifying the latest scheduled job preceded by a time gap within the critical path of a Service.

FIG. 5 shows an example method 500 that implements block 500 of FIG. 3 to mark the latest job within a critical path time gap of a Service, in accordance with at least some embodiments. The latest job within the Service (i.e., the job scheduled to start executing last) is selected as a starting point for the method (block 502). If the selected job has a preceding time gap (block 504), it is marked as the latest job with a time gap within the critical path of the Service (block 510), ending the method (block 512). If the selected job is not preceded by a time gap (block 504) but has additional unprocessed predecessor jobs (block 506), the predecessor job with an estimated execution end time that is closest (but not after) the start time of the selected job is selected as the current job (block 508).

Blocks 504-510 are subsequently repeated until no predecessor jobs remain (block 506), ending the method (block 512). Because the closest predecessor is always selected as the next job, method 500 follows the critical path within the Service, and thus identifies the job within the critical path of the Service that has a preceding time gap and that starts execution at the latest time, as compared to other critical path jobs with preceding time gaps.

Figure 6B:
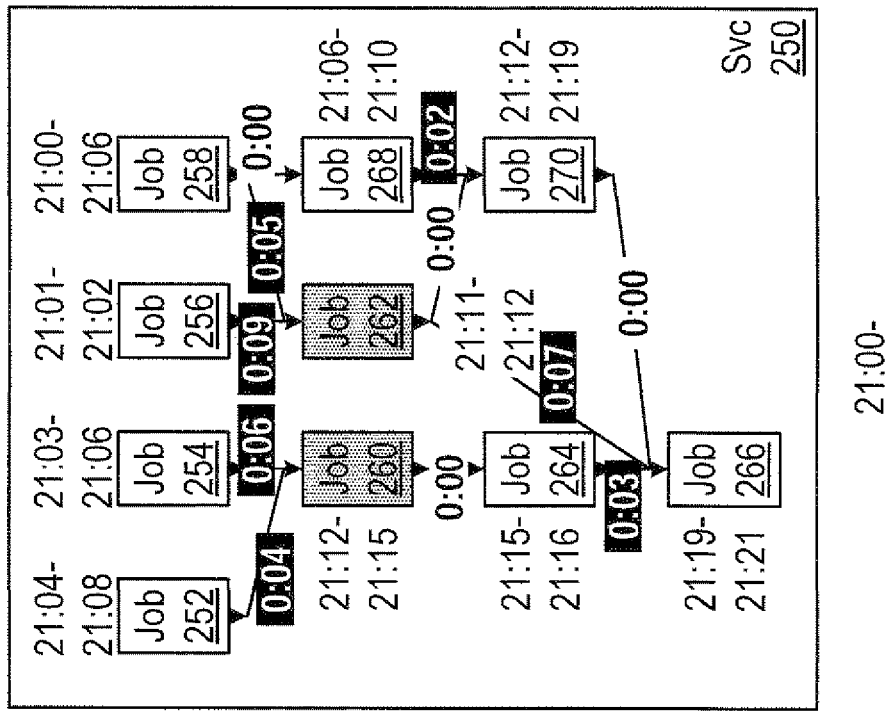
FIGS. 6A-6H illustrate an example of how a job flow is adjusted using the example methods of FIGS. 3, 4 and 5.
Figure 6A:
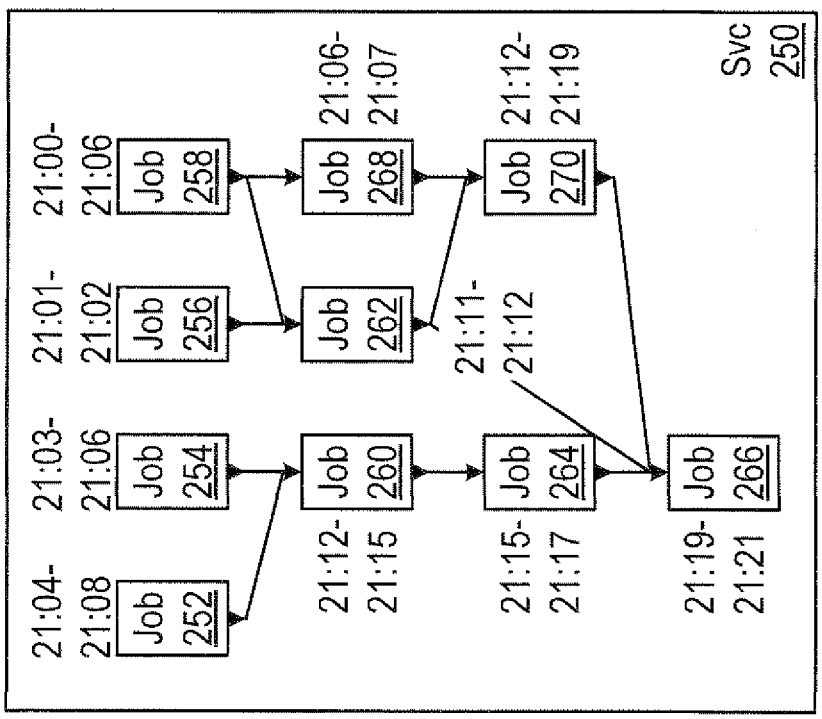

To illustrate the above-described methods of FIGS. 3-5, FIGS. 6A-6H provide an example showing the results of the application of these methods. FIG. 6A shows Service 250 of FIG. 2 with two new jobs 268 and 270 added to the Service. Because job 270 ends at 21:19, job 266 (and thus Service 250) is now estimated by the simulation to end at 21:21, which exceeds the must complete by time of 21:20 required for Service 250. The intermediate and end results of applying methods 300, 400 and 500 to Service 250 of FIG. 6A are illustrated in FIGS. 6B-GH. FIG. 6B shows the results of finding jobs that have preceding time gaps (i.e., non zero time gaps between a job and all of its predecessor jobs). These jobs are indicated with a dotted fill pattern, with the time difference values shown as white text on a black background for each interdependency. Interdependencies with no time difference are shown with a value of 0:00 in black text.

Figure 6D:
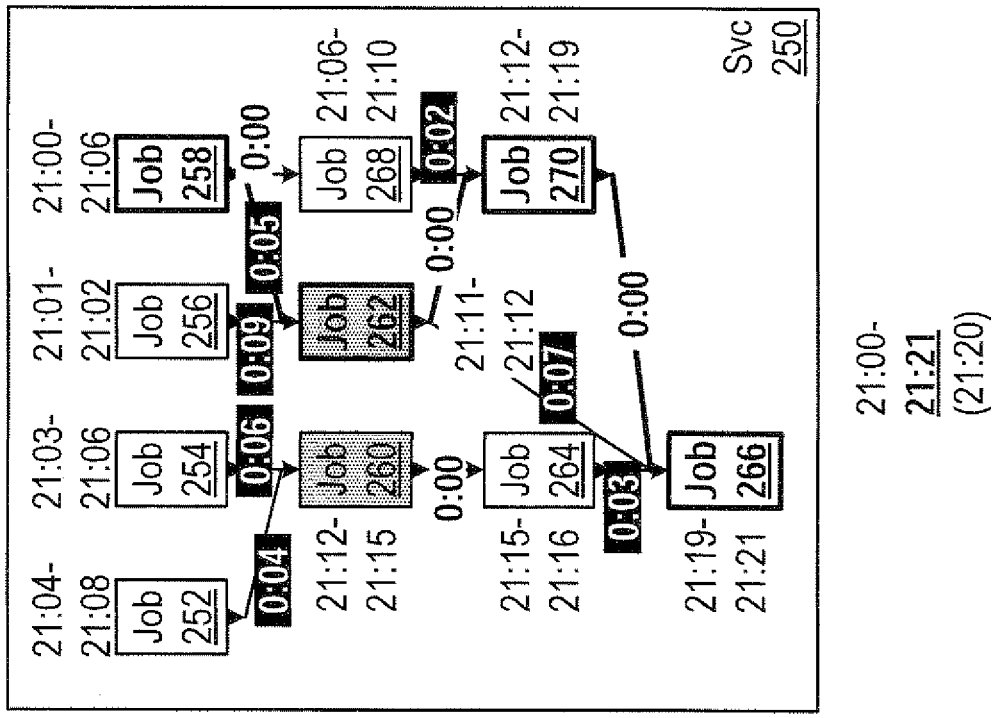
Figure 6C:
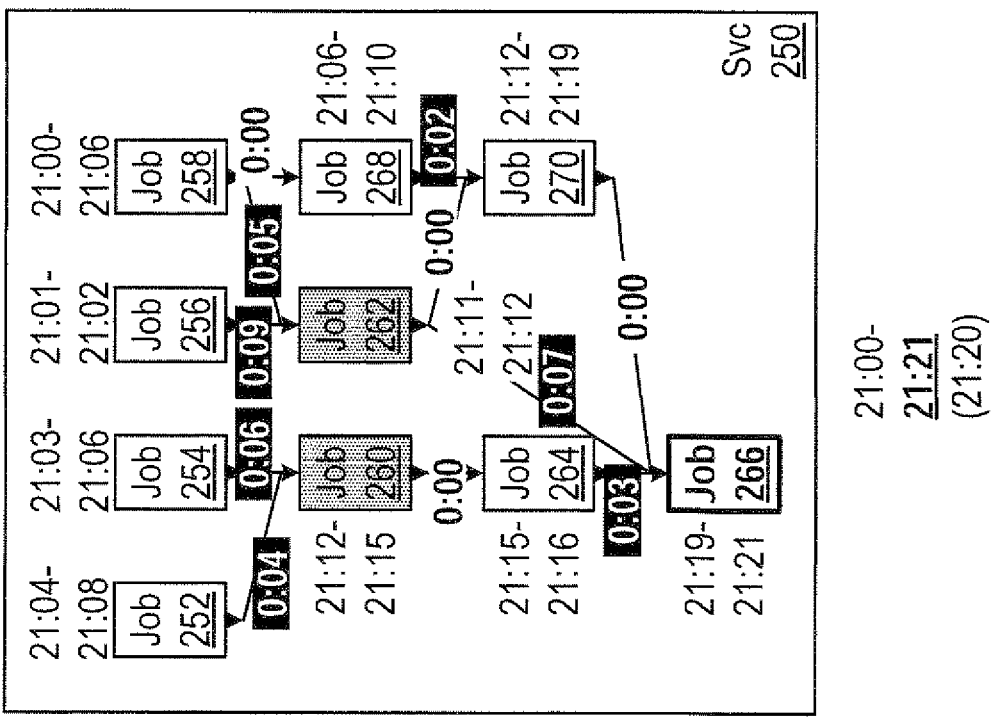
Figure 6F:
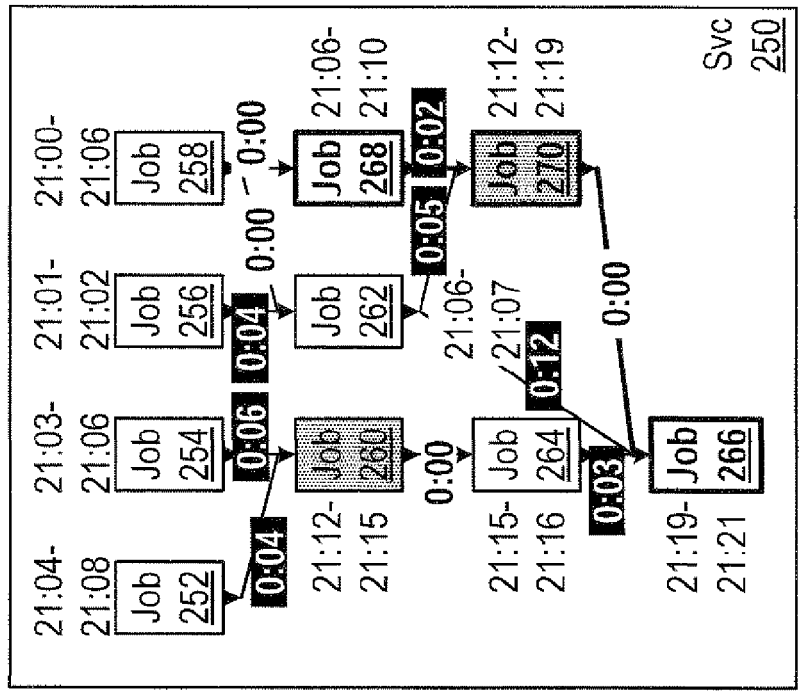

FIG. 6C shows the selection of the latest job (266). As previously shown and described, the critical path is traced out by repeatedly selecting the closest predecessor job of each selected job until a job preceded by a time gap is identified or the full critical path is traversed. If a job and a predecessor separated by a time difference of 0:00 is encountered, the predecessor is treated as closest to the job. FIG. 6D shows the result of traversing the critical path of Service 250 (highlighted in bold text and lines). The critical path is shown traversing jobs 266, 270, 262 and 258. The latest (and only) job within the critical path preceded by a time gap is job 262 (the gap consisting of two non-zero time differences of eight and five minutes).

Figure 6E:
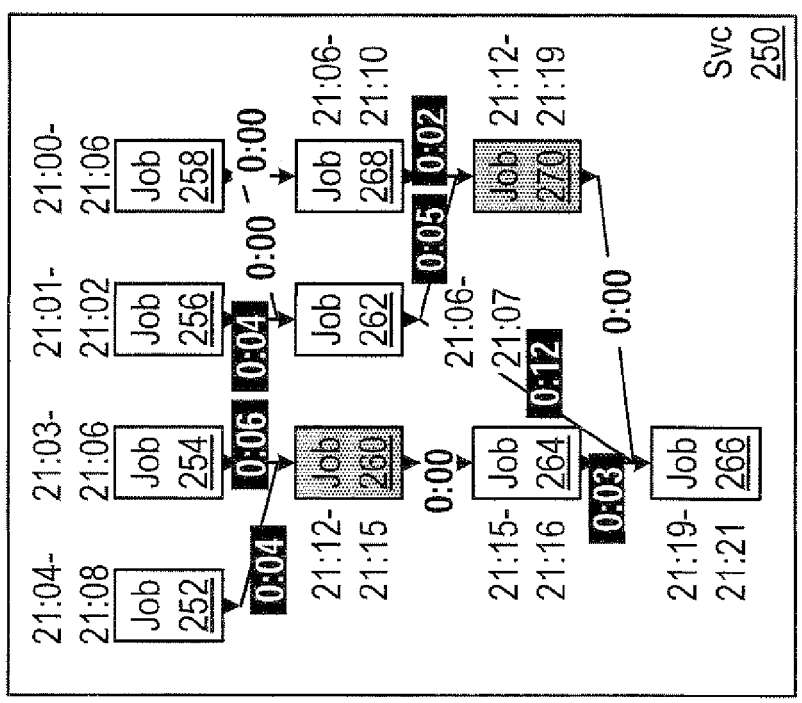
Figure 6H:
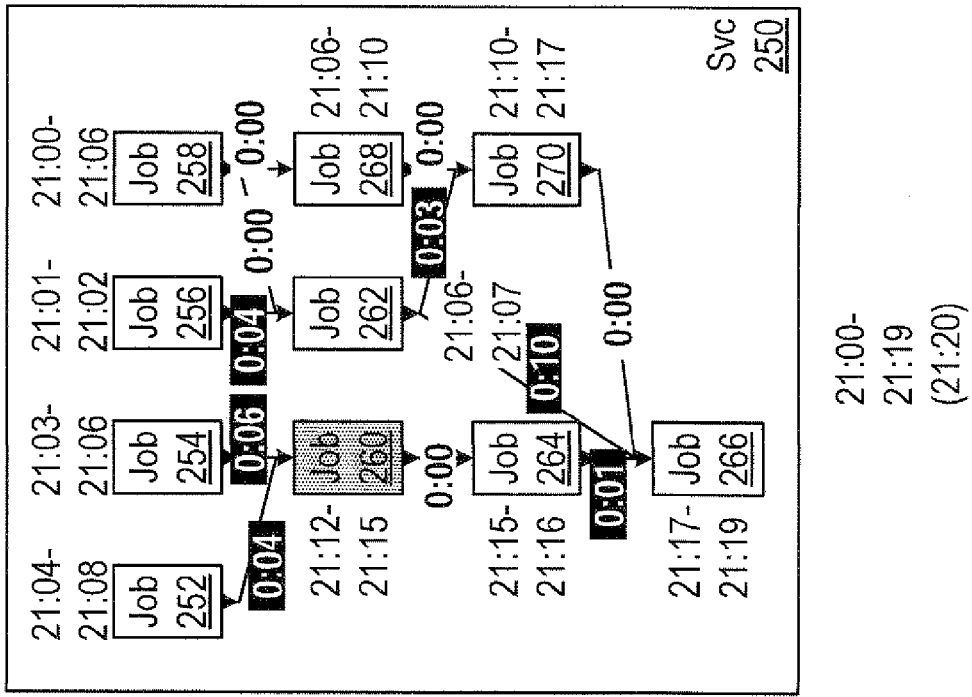
Figure 6G:
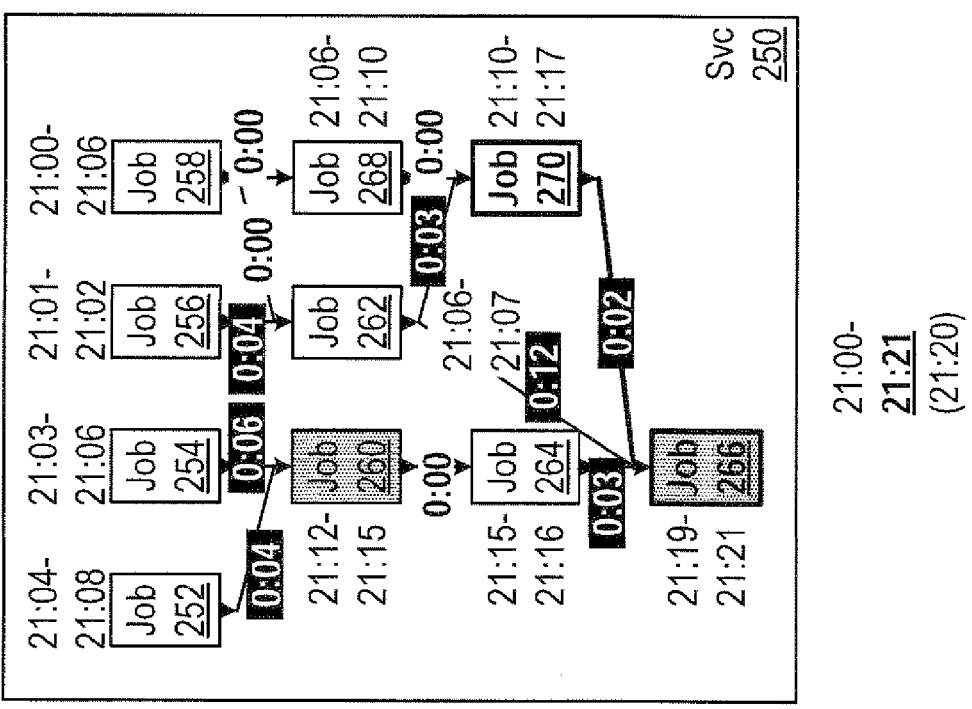

FIG. 6E shows Service 250 after the start time of job 262 has been adjusted to reduce (and in this case eliminate) the preceding time difference between job 262 and its closest predecessor, job 258. Job 262 now starts at 21:06 and is estimated to end at 21:07. The time differences preceding job 262 are now four and zero minutes, and the time differences after job 262 are now twelve and five minutes. The methods are again applied, this time to Service 250 as it is shown if FIG. 6E, resulting in the identification of job 270 as the latest job preceded by a time gap on a new critical path, which traverses jobs 266, 270 and 268, as shown if FIG. 6F. Here, the section of interest is highlighted (i.e., the section including the latest job preceded by a time gap) rather than the entire critical path. Again, the latest job's preceding time difference with the closest predecessor job (268) is reduced (eliminated), resulting in the changes to the time differences and start/end times as shown in FIG. 6G. FIG. 6G also shows an updated partial critical path that identifies job 266 as the latest job with a preceding time gap. The time difference between job 266 and job 270 is subsequently reduced (eliminated) to produce Service 250 scheduled as shown in FIG. 6H. As can be seen, the Service is now estimated to end at 21:19, which is before the required must complete by time.

Alternatively, a time difference may be reduced but not eliminated. Thus, for example, the time difference of two minutes shown in FIG. 6G between jobs 266 and 270 could have been reduced by only one minute. This would have resulted in an estimated end time of 21:20, which still would have caused Service 250 to end at least by the must complete by time required for the Service.

By grouping jobs into Services a user is able to focus on those jobs most directly affected by the rescheduling of existing jobs or the addition of new jobs. Further, by automating the process of identifying the latest jobs within the critical path of a Service, a user is quickly provided with the information needed to effectively and efficiently remedy the situation while minimizing the number of jobs that need be rescheduled. This automation of the process can reduce, if not eliminate, the need for trial and error approaches that consume large amounts of time and frequently yield less than optimal results. Automation of the process also speeds up the response time to a scheduling violation, thus decreasing the probability that scheduled jobs and Services will begin and/or end executing before the violation can be corrected.

FIGS. 7A-7C illustrate examples of various user interfaces that may be presented to the user for interacting with batch scheduling software 122 of FIG. 1, in accordance with at least some embodiments. While the jobs and Services shown in FIGS. 7A-7C do not correspond to those shown in the examples previously presented, they serve to illustrate how the general principals presented herein may be put to practical use.

FIG. 7A shows a display 700 that presents a queue under control of an instance of the batch management software (CTM1) that manages a displayed queue. The main display area 702 is a zoomed window within the queue. The position of this window is shown in secondary window 704, where jobs and Services are shown as color coded squares. The colors (not shown) provide an indication of the status of each job or Service. For example, green can be used to indicate a job or Service that is currently projected to meet its must complete by time. Yellow may be used to indicate a job or Service that is projected to not meet its must complete by times, and red may be used to indicate a job or Service that has already failed to meet its must complete by time. Main display 702 shows each job or Service as individual squares that contain basic information about the job or Service (e.g., job/Service name). Services may be expanded as shown to display the jobs within a Service, and interdependencies between jobs and Services are displayed with interdependency lines similar to those of FIG. 2.

FIG. 7B shows a variation of the display shown in FIG. 7A, with an additional status listing area 706 added. This status area shows the various jobs and Services within a queue together with information related to each job or Service. FIG. 7B also shows an example of various jobs within the "Demo-SplitBackup" Service that have been highlighted (surrounded by a white border) to indicate those jobs that are preceded by a time gap. In at least some embodiments the display would be in color, and the box would be shown in a more easily seen color (e.g., yellow). FIG. 7B also shows the "prep_for_backup" job displayed in reverse video to indicate that this job has been marked as the latest job within the critical path of the Service. The job is also similarly highlighted in status area 706 for quick identification of information related to the marked job. FIG. 7C shows drop-down Service menu 708 with the "Find Latest Time-Gap In Critical Path" option selected. Such an option could be selected to trigger execution of methods 300, 400 and 500, implemented by batch scheduling software 122 of FIG. 1.

Figure 8:
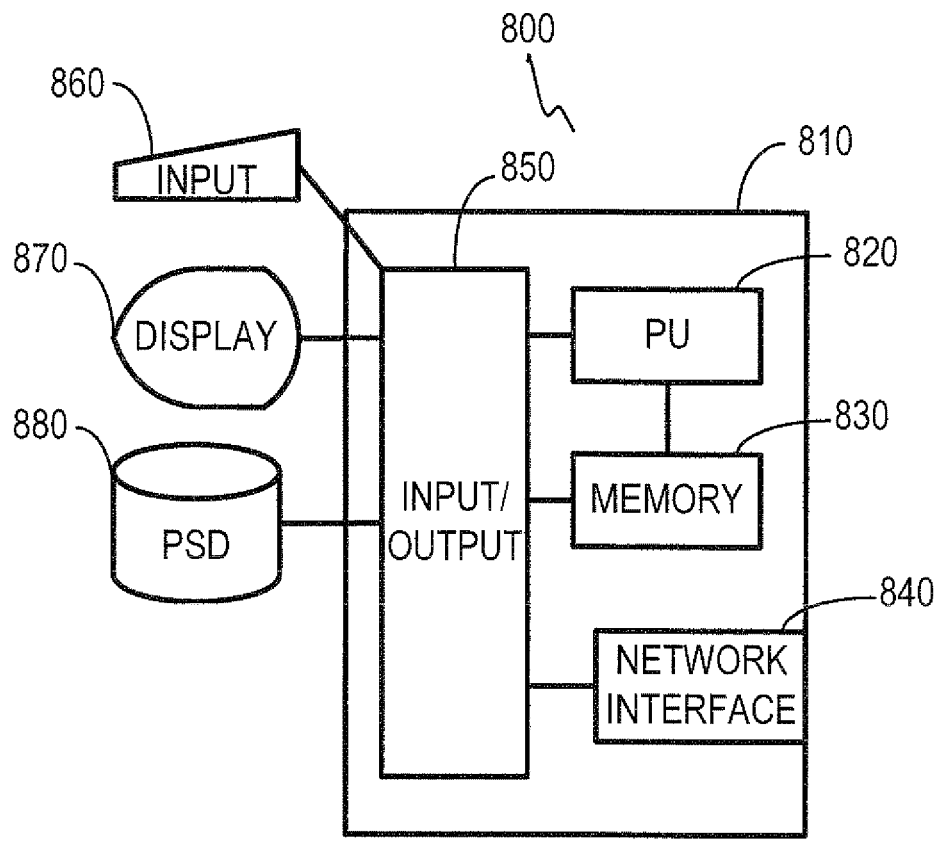
FIG. 8 illustrates an example of a computer system suitable for executing software that performs at least some of the functionality described herein.

Referring now to FIG. 8, an example computer system 800 is shown that may be used as a batch queue management station such as mainframe 110 of FIG. 1. Example computer system 800 may include a programmable control device 810 which may be optionally connected to input 860 (e.g., a keyboard, mouse, touch screen, etc.), display 870 or non-volatile/persistent storage device (PSD) 880 (sometimes referred to as direct access storage device DASD). Also, included with programmable control device 810 is a network interface 840 for communication via a network with other computing and corporate infrastructure devices (see, e.g., network 102 of FIG. 1). Note that network interface 840 may be included within programmable control device 810 or be external to programmable control device 810. In either case, programmable control device 810 will be communicatively coupled to network interface 840. Also note that non-volatile storage unit 880 represents any form of non-volatile storage including, but not limited to, all forms of optical, magnetic and solid-state storage elements.

Programmable control device 810 may be included in a computer system and be programmed to perform methods in accordance with this disclosure (e.g., methods 300, 400 and 500 illustrated in FIGS. 3, 4 and 5). Programmable control device 810 includes a processing unit (PU) 820, input-output (I/O) interface 850 and memory 830. Processing unit 820 may include any programmable controller device including, for example, processors of an IBM mainframe (such as a quad-core System z10 mainframe microprocessor). Alternatively, in non mainframe systems, examples of processing unit 820 include the Intel Core®, Pentium® and Celeron® processor families from Intel and the Cortex® and ARM® processor families from ARM. (System z10 is a registered trademark of the International Business Machines Corporation. INTEL CORE, PENTIUM and CELERON are registered trademarks of the Intel Corporation. CORTEX is a registered trademark of the ARM Limited Corporation. ARM is a registered trademark of the ARM Limited Company.) Memory 830 may include one or more memory modules and include random access memory (RAM), read only memory (ROM), programmable read only memory (PROM), programmable read-write memory, and solid state memory. One of ordinary skill in the art will also recognize that PU 820 may also include some internal memory including, for example, cache memory.

In addition, acts in accordance with the methods of FIGS. 3, 4 and 5 may be performed by an example computer system 800 including a single computer processor, a special purpose processor (e.g., a digital signal processor, "DSP"), a plurality of processors coupled by a communications link, a custom designed state machine, or any other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium," "computer-usable medium" or "computer-readable storage medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as network 102 and/or a wireless link.

Although the examples described include software executing on individual, self-contained physical computers, software that implements the functionality described herein is not limited to such physical computers. Those of ordinary skill in the art will recognize that other computer system implementations may be suitable for executing software that implements at least some of the functionality described herein (e.g., methods 300, 400 and 500 of FIGS. 3, 4 and 5). These implementations may include virtualized computer systems (e.g., systems implemented using z/VM virtual machine software), and distributed computer systems (e.g., diskless workstations and netbooks), just to name a few examples. All such implementations and variations of a computer system are contemplated by the present disclosure.

The above discussion is meant to illustrate the principles of at least some example embodiments of the claimed subject matter. Various features are occasionally grouped together in a single embodiment for the purpose of streamlining the disclosure. This method of disclosure is not to be interpreted as reflecting an intention that the embodiments of the claimed subject matter require more features than are expressly recited in each claim.

Various changes in the details of the illustrated operational methods are possible without departing from the scope of the claims that follow. For instance, illustrative flow chart steps or process steps of FIGS. 3, 4 and 5 may perform the identified steps in an order different from that disclosed here. Alternatively, some embodiments may combine the activities described herein as being separate steps. Similarly, one or more of the described steps may be omitted, depending upon the specific operational environment the method is being implemented in.

Other variations and modifications will become apparent to those of ordinary skill in the art once the above disclosure is fully appreciated. For example, although the embodiments described refer to batch queues implemented, managed and maintained on mainframe computers, the systems and methods described herein may also be used on many other real or virtual computer systems, including but not limited to personal computers and workstations, just to name two examples. Further, although shown as a single software module, the event processing software described may also be implemented as two or more separate software modules that communicate with each other (e.g., using shared memory or inter-process communication (IPC) mechanisms). It is intended that the following claims be interpreted to include all such variations and modifications.

What is claimed is:

1. A computer system for managing a flow of batch jobs, comprising:
    a memory comprising a plurality of jobs within a batch queue grouped together into one or more services that each comprises a job and a predecessor job, wherein a time difference comprises the difference between a scheduled start time of the job and an estimated end time of the predecessor job,
    wherein jobs with a preceding time gap comprise jobs immediately preceded only by non-zero time differences, and
    wherein the job start depends upon the predecessor job completion; and
    a processing unit, coupled to the memory, that identifies those jobs of the plurality of jobs preceded by a time gap, selects a service of the one or more services, traverses in reverse chronological order a critical path of dependent jobs within the selected service until a latest job with a preceding time gap is identified or until at least those jobs along the critical path preceded by another job are traversed,
    reduces the time difference between the latest job with a preceding time gap and a nearest predecessor job, and
    repeats the traversing and reducing until no jobs with time gaps remain along the critical path or until an estimated end time of the selected service is less than or equal to a target end time,
    wherein the processing unit traverses the critical path by selecting, for each job preceded by another job along the critical path, a nearest predecessor job with an estimated end time that is closest to, but not greater than, a scheduled start time of a currently selected job.

2. The computer system of claim 1, further comprising a display device, wherein the latest job with a preceding time gap, if identified, is indicated on the display device.

3. The computer system of claim 1, wherein the processing unit further adds new jobs to a service.

4. The computer system of claim 3, wherein the processing unit further runs a simulation to estimate an execution end time for the service.

5. The computer system of claim 1, wherein the processing unit further repeats the service selection for each of the one or more services.

6. The computer system of claim 1, wherein the processing unit simulates the execution of all scheduled jobs within the batch queue to estimate the end time of each of the plurality of jobs.

7. A method for managing a flow of batch jobs within a computer system, comprising:
    grouping, by the computer system, a plurality of jobs within a batch queue into one or more services that each comprises a job and a predecessor job;
    determining, by the computer system, a time difference comprising the difference between a scheduled start time of the job and an estimated end time of the predecessor job, the job start depending upon the predecessor job completion;
    identifying, by the computer system, those jobs of the plurality of jobs preceded by a time gap, which comprise jobs immediately preceded only by non-zero time differences;
    selecting, by the computer system, a service of the one or more services; traversing, by the computer system, in reverse chronological order a critical path of dependent jobs within the selected service until a latest job with a preceding time gap is identified or until at least those jobs along the critical path preceded by another job are traversed;
    reducing, by the computer system, the time difference between the latest job with a preceding time gap and a nearest predecessor job; and
    repeating the traversing and reducing until no jobs with time gaps remain along the critical path or until an estimated end time of the selected service is less than or equal to a target end time,
    wherein traversing the critical path comprises selecting, for each job preceded by another job along the critical path, a nearest predecessor job with an estimated end time that is closest to, but not greater than, a scheduled start time of a currently selected job.

8. The method of claim 7, further comprising displaying, if identified, the latest job with a preceding time gap by the computer system.

9. The method of claim 7, further comprising adding, by the computer system, new jobs to a service.

10. The method of claim 9, further comprising running a simulation to estimate an execution end time for the service.

11. The method of claim 7, further comprising repeating the selecting for each of the one or more services.

12. The method of claim 7, further comprising estimating, by the computer system, the end time of each of the plurality of jobs by performing a simulation of the execution of all scheduled jobs within the batch queue.

13. A non-transitory computer-readable storage medium comprising software that can be executed on a processor to cause the processor to perform a method for managing a flow of batch jobs within a computer system, comprising:

grouping, by the computer system, a plurality of jobs within a batch queue into one or more services that each comprises a job and a predecessor job;

determining, by the computer system, a time difference comprising the difference between a scheduled start time of the job and an estimated end time of the predecessor job, the job start depending upon the predecessor job completion;

identifying, by the computer system, those jobs of the plurality of jobs preceded by a time gap, which comprise jobs immediately preceded only by non-zero time differences;

selecting, by the computer system, a service of the one or more services;

traversing, by the computer system, in reverse chronological order a critical path of dependent jobs within the selected service until a latest job with a preceding time gap is identified or until at least those jobs along the critical path preceded by another job are traversed;

reducing, by the computer system, the time difference between the latest job with a preceding time gap and a nearest predecessor job; and repeating the traversing and reducing until no jobs with time gaps remain along the critical path or until an estimated end time of the selected service is less than or equal to a target end time, wherein traversing the critical path comprising selecting, for each job preceded by another job along the critical path, a nearest predecessor job with an estimated end time that is closest to, but not greater than, a scheduled start time of a currently selected job.

14. A networked computer system, comprising:

a communication network; and a plurality of computer systems each coupled to the communication network, at least one computer system of the plurality of computer systems comprising: a memory comprising a plurality of jobs within a batch queue grouped together into one or more services that each comprises a job and a predecessor job, wherein a time difference comprises the difference between a scheduled start time of the job and an estimated end time of the predecessor job, wherein jobs with a preceding time gap comprise jobs immediately preceded only by non-zero time differences, and wherein the job start depends upon the predecessor job completion; and a processing unit, coupled to the memory, that identifies those jobs of the plurality of jobs preceded by a time gap, selects a service of the one or more services, and traverses in reverse chronological order a critical path of dependent jobs within the selected service until a latest job with a preceding time gap is identified or until at least those jobs along the critical path preceded by another job are traversed, reduces the time difference between the latest job with a preceding time gap and a nearest predecessor job, and repeats the traversing and reducing until no jobs with time gaps remain along the critical path or until an estimated end time of the selected service is less than or equal to a target end time, wherein the processing unit traverses the critical path by selecting, for each job preceded by another job along the critical path, a nearest predecessor job with an estimated end time that is closest to, but not greater than, a scheduled start time of a currently selected job.

15. The networked computer system of claim 14, wherein the at least one computer system further comprises a display device, and wherein the latest job with a preceding time gap, if identified, is indicated on the display device.

16. The networked computer system of claim 14, where the processing unit further adds new jobs to a service.

17. The computer system of claim 16, wherein the processing unit further runs a simulation to estimate an execution end time for the service.

18. The networked computer system of claim 14, wherein the processing unit further repeats the service selection for each of the one or more services.

19. The networked computer system of claim 14, wherein the processing unit simulates the execution of all scheduled jobs within the batch queue to estimate the end time of each of the plurality of jobs.

* * * * *